United States Patent [19]

Clark et al.

[11] Patent Number: 4,764,055

[45] Date of Patent: Aug. 16, 1988

[54] RESIN REINFORCED EXPANSION ANCHOR SYSTEM

[75] Inventors: Carl A. Clark, Liverpool; Raymond L. Wright, Syracuse, both of N.Y.

[73] Assignee: Birmingham Bolt Company, Inc., Birmingham, Ala.

[21] Appl. No.: 102,795

[22] Filed: Sep. 23, 1987

Related U.S. Application Data

[63] Continuation of Ser. No. 915,158, Oct. 2, 1986, abandoned.

[51] Int. Cl.$^4$ ............................................. E21D 20/02
[52] U.S. Cl. .................................... 405/261; 411/51; 411/57
[58] Field of Search ............. 405/259, 260, 261; 411/44, 45, 49, 50, 51, 55, 57, 60, 71, 72

[56] References Cited

U.S. PATENT DOCUMENTS

| Re. 31,776 | 12/1984 | Clark et al. | 405/261 |
|---|---|---|---|
| 2,685,221 | 8/1954 | Barrett | 411/55 |
| 3,381,567 | 5/1968 | Askey | 411/51 |
| 3,941,028 | 3/1976 | Lobello et al. | 411/57 X |
| 4,160,614 | 7/1979 | Koval | 405/259 |
| 4,173,918 | 11/1979 | Piersall | 411/51 |
| 4,193,715 | 3/1980 | Vass | 405/261 |
| 4,483,645 | 11/1984 | White et al. | 405/261 |
| 4,534,679 | 8/1985 | White et al. | 405/261 |
| 4,611,954 | 9/1986 | Cassidy | 405/261 |
| 4,664,561 | 5/1987 | Frease | 405/261 |
| 4,679,966 | 7/1987 | Yacisin | 405/261 |

FOREIGN PATENT DOCUMENTS

| 751137 | 1/1967 | Canada | 411/55 |
|---|---|---|---|
| 2221267 | 1/1978 | Fed. Rep. of Germany | 411/55 |

Primary Examiner—David H. Corbin
Attorney, Agent, or Firm—Shlesinger, Arkwright & Garvey

[57] ABSTRACT

A resin reinforced expansion anchor system for a mine roof support bolt or the like utilizes a specially configured, thin-walled expansion shell together with a thin-walled, dual-taper plug for expanding the shell. The shell and the plug cooperate to implement a particularly desirable type of mechanical expansion anchoring action while simultaneously providing a symmetrical array of resin flow passages at circumferentially spaced locations about the anchor assembly to permit proper distribution and flow of a quick setting resin mix. The system of the invention enables a relatively large diameter rock bolt or threaded bar to be securely anchored in a blind drilled hole that is of relatively small diameter, with the anchoring action of a mechanical expansion anchor assembly being desirably augumented by the anchoring action of a concurrently established resin bond. The system of the present invention has particular utility in providing a means for effecting combined mechanical expansion anchoring and resin bond anchoring of a relatively large diameter threaded member such as a $\frac{7}{8}$" rock bolt that is installed in a relatively small diameter hole such as a $1\frac{3}{8}$" blind drilled hole that is formed in a mine roof or the like.

11 Claims, 4 Drawing Sheets

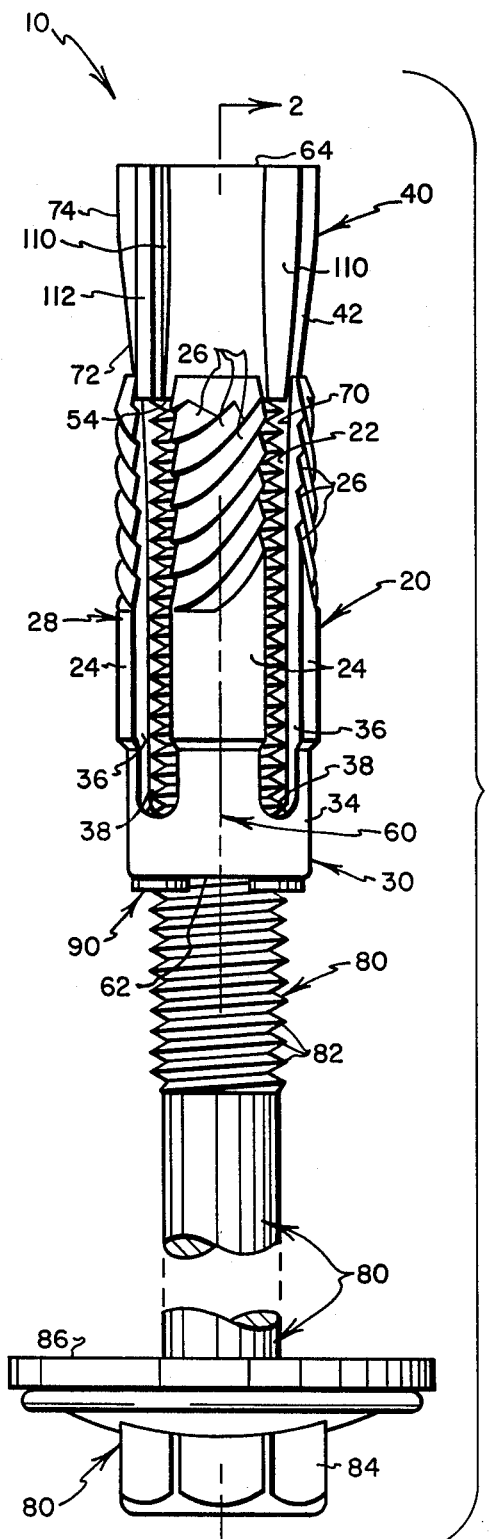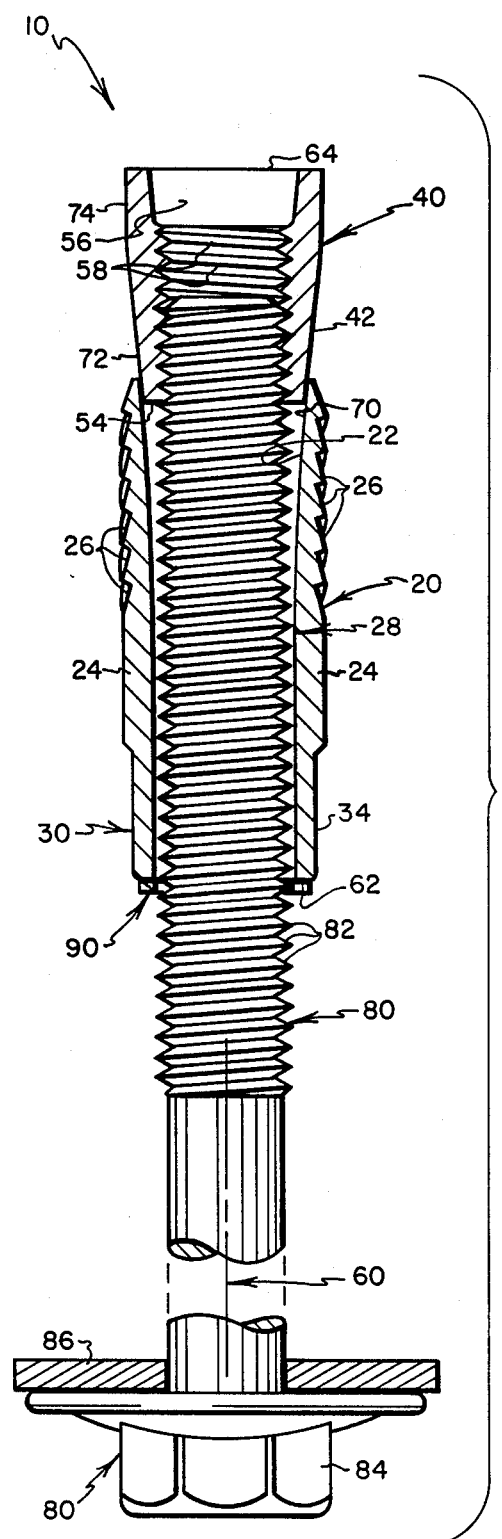
FIG. 1
FIG. 2

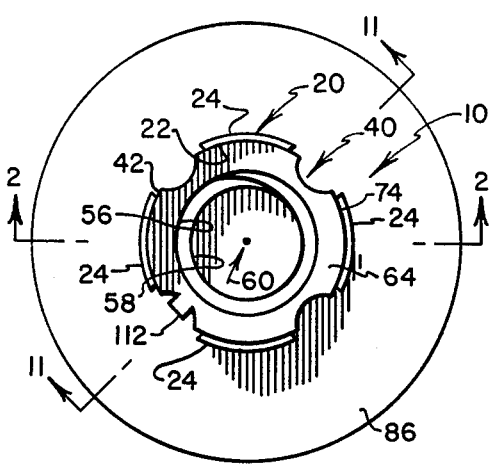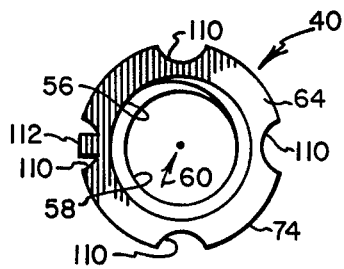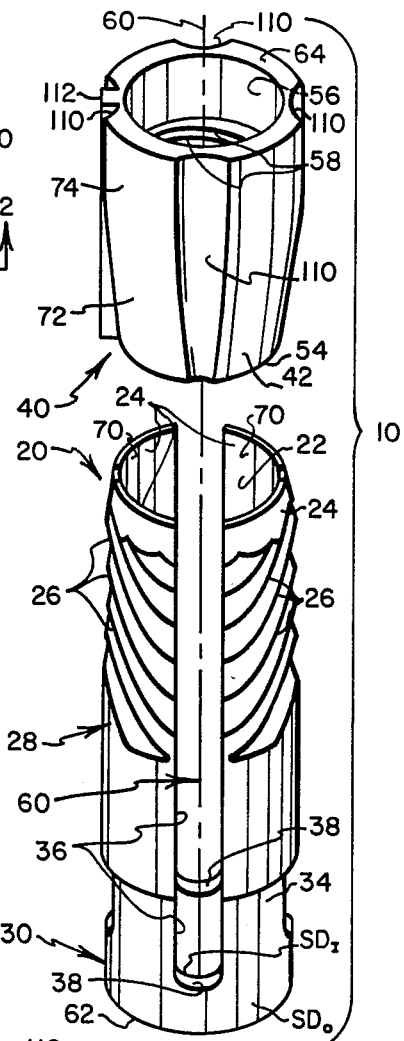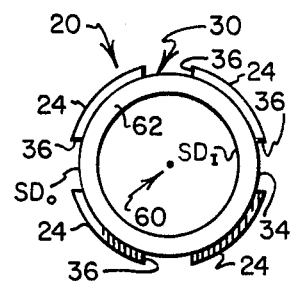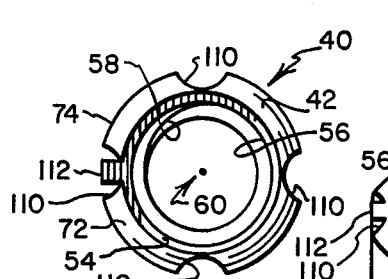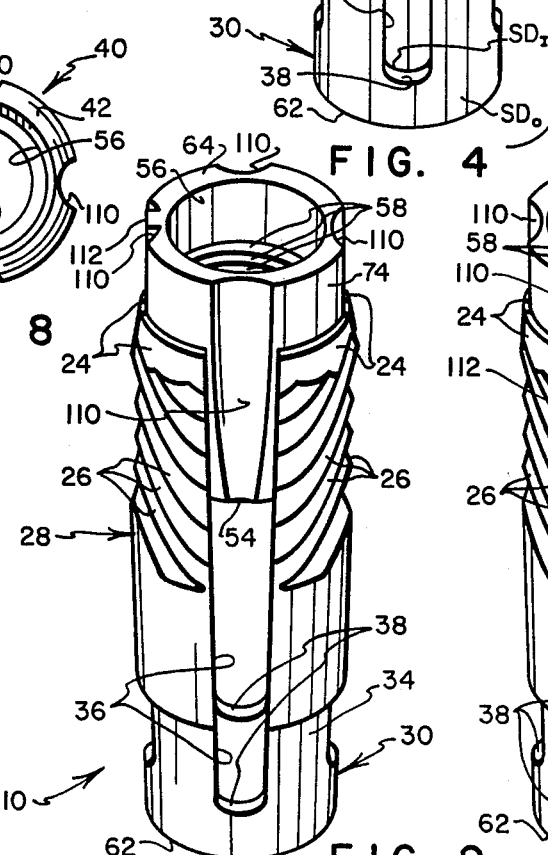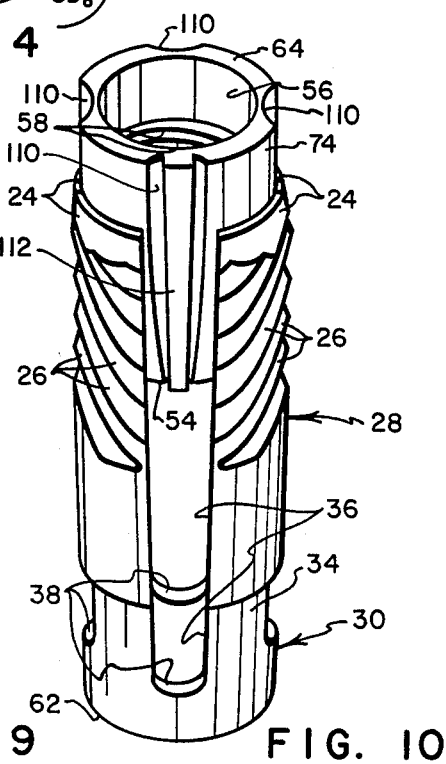

RESIN REINFORCED EXPANSION ANCHOR SYSTEM

This application is a continuation of application Ser. No. 915,158, filed 10/2/86, now abandoned.

CROSS-REFERENCE TO CO-PENDING APPLICATION

Reference is made to a co-pending application that is assigned to The Eastern Company, the assignee of the present application, namely application Ser. No. 898,142, filed Aug. 19, 1986, by John S. Brown, Jr., entitled MINE ROOF SUPPORT BOLT SYSTEM, hereinafter referred to as the "Snap Ring Case," the disclosure of which is incorporated herein by reference.

BACKGROUND OF THE INVENTION

1. Field of the Invention

The present invention relates generally to a novel and improved resin reinforced expansion anchor system that utilizes a specially configured, thin-walled expansion shell together with a thin-walled, dual-taper plug for expanding the shell, wherein the shell and the plug cooperate to implement a particularly desirable type of mechanical expansion anchoring action while simultaneously providing a symmetrical array of resin flow passages at circumferentially spaced locations about the anchor assembly to permit proper distribution and flow of a quick setting resin mix as a relatively large diameter rock bolt or threaded bar is being securely anchored in a blind drilled hole of relatively small diameter, with the anchoring action of the mechanical expansion anchor assembly being desirably augmented by the anchoring action of a concurrently established resin bond. More specifically, the system of the present invention provides a means for effecting combined mechanical expansion anchoring and resin bond anchoring of a relatively large diameter threaded member such as a $\frac{7}{8}''$ rock bolt in a relatively small diameter hole such as a $1\frac{3}{8}''$ blind drilled hole.

2. Prior Art

In mine work, such as coal mining, and in tunnel and excavation work, often it is necessary to reinforce and support roof and/or wall formations to prevent rock falls or cave-ins. The needed reinforcement and support typically is provided (1) by drilling a spaced array of blind holes into the roof and/or wall formations that are to be supported, (2) by installing elongate bolts or bars into the blind drilled holes (with each of the bolts or bars being inserted into a separate one of the drilled holes), (3) by "anchoring" the bolts or bars in place in their respective blind drilled holes, and (4) by utilizing such portions of the bolts or bars as project out of the blind drilled holes to connect with and clampingly retain support plates in place against such roof and/or wall formations as require reinforcement and support.

The "anchoring" of end regions of bolts or bars that are inserted into blind drilled holes typically is effected either (1) by utilizing mechanical anchor assemblies that are threaded onto the end regions of the bolts or bars, and that are expanded in situ to rigidly connect the bolts or bars to rock formations that define the side walls of the blind drilled holes, or (2) by utilizing a quick setting resin, the components of which are mixed in situ in the blind drilled holes, and that is distributed immediately upon being mixed so as to flow about outer surface portions of the bolts or bars and about inner surface portions of the blind drilled holes to establish what is referred to as "resin bond anchoring" between the bolts or bars and their surrounding rock formations.

The diameter of a blind drilled hole that is formed in a mine roof or the like to receive a rock bolt or a reinforcing bar that is to be anchored in the hole depends in large part on the character of the anchoring system that is to be employed. When a mechanical expansion anchor assembly is to be used, the diameter of the blind drilled hole must take into account both the minimum diameter that will permit free insertion of the anchor assembly into the hole, and the maximum diameter with which the expansion anchor assembly can safely be deployed. If the drilled hole is too small in diameter, installation problems arise inasmuch as the expansion anchor assembly cannot be inserted with ease into the drilled hole. If the drilled hole is too large in diameter, the expansion anchor assembly cannot properly anchor to rock formations that surround the hole. When a resin bond anchoring system is to be used, the diameter of the blind drilled hole is preferably kept relatively small so that a reasonable quantity of expensive resin material inserted into the hole will effect proper anchoring of a rod or bar to surrounding rock formations.

When, for example, a rod or bar having a nominal $\frac{7}{8}''$ diameter is to be anchored in a blind drilled hole formed in a mine roof, use of an expansion anchor assembly typically will require the drilling of a hole having a diameter of $1\frac{1}{2}''$, $1\frac{5}{8}''$ or $1\frac{3}{4}''$ depending on the character of the expansion anchor assembly that is selected for use. However, if resin bond anchoring is to be used, a hole diameter of $1\frac{1}{4}''$, $1\frac{1}{4}''$ or $1\frac{3}{8}''$ normally would be selected, with one of the smaller of these hole diameters being chosen when use of expensive bonding resin must be kept to a minimum, and with one of the larger hole diameters being chosen when there is a need to maximize the surface area of contact between the bonding resin and the rock formations that surround the blind drilled hole.

While proposals have been made to utilize resin bond anchoring in combination with mechanical expansion anchoring to reinforce or otherwise strengthen or complement the anchoring of a bolt or bar in a drilled hole, a problem that has tended to limit the use in combination of these two types of anchoring systems has been the large quantities of expensive resin that are needed to properly fill the relatively large diameter holes that are characteristically used with mechanical expansion anchor assemblies. Thus, the need has been recognized to provide mechanical expansion anchor assemblies that require the drilling of smaller diameter holes in mine roofs and the like so that, if resin bond anchoring is to be used in combination with mechanical expansion anchoring, less expensive quantities of bonding resin will suffice to effect the desired resin bond anchoring.

Combined use of mechanical expansion anchoring with resin bond anchoring has proved to be advantageous in applications where neither of these different types of anchoring used alone is found to provide a fully satisfactory anchor, and where neither of these types of anchoring are found to interfere with proper operation of the other. Stated in another way, the very different characteristics of these contrasting types of anchoring systems often can be used to advantage to augment or complement each other, so long as the associated conditions of use are not such as to cause the operation of one of the types of anchoring to interfere with proper operation of the other.

An example of an application wherein combined use of mechanical expansion anchoring and resin bond anchoring often is desirable, but where a combination of the two types of anchoring systems has led to interference of one with the proper operation of the other, arises when a relatively large diameter rock bolt or threaded bar needs to be anchored in a relatively small diameter blind drilled hole. Such a situation presents a problem in that there is relatively little clearance between the outer diameter of the threaded bolt or bar and the interior of the drilled hole, whereby a mechanical expansion anchor assembly that is threaded onto a bolt or bar and is expanded to anchor the bolt or bar tends to fill the majority of the available space, thus leaving neither adequate space nor flow paths for positioning and distribution of resin. A particularly difficult problem arises when a rock bolt or threaded bar having a relatively large nominal diameter of ⅞" needs to be securely anchored in a blind drilled hole having a relatively small nominal inner diameter of 1 ⅜". If an expansion anchor of conventional design is to be used in such an application, the material that forms the relatively movable components of the anchor occupies substantially all of the available space between the outer diameter of the bolt or bar and the inner diameter of the drilled hole. Resin bond reinforcement of an expansion anchor in such an installation is rendered extremely difficult by virtue of the fact that the material which forms the components of the expansion anchor assembly fills or otherwise blocks off substantially all of the available space between the bolt or bar and the walls of the blind drilled hole, whereby adequate space and flow paths for positioning and distribution of resin in order to effect a proper resin bond anchoring action cannot be relied upon to be present.

Stated in another way, conventionally configured expansion anchor assemblies have not proved adequate for use in securing relatively large diameter rock bolts or bars (e.g., ⅞" diameter) within blind drilled holes of relatively small diameter (e.g., holes having inner diameters of 1 ⅜"), the reason being principally that the material that comprises the relatively movable components of the expansion anchor assemblies tends to fill, block and/or obstruct spaces and flow paths that are needed within the blind drilled holes in order for resin to achieve a proper anchoring effect. Thus, conventionally configured expansion anchor devices have been found to interfere with proper mixing, positioning and flow of resin when attempts have been made to use conventionally configured mechanical expansion anchors in combination with resin bond anchoring to anchor some relatively large commercially available sizes of rock bolts or threaded bars in relatively small diameter blind drilled holes, with particularly difficult problems being encountered in instances where bolts or bars of a nominal ⅞" diameter need to be anchored securely in blind drilled holes having nominal 1 ⅜" diameters.

The Referenced Snap Ring Case

The referenced Snap Ring Case relates to a mine roof support bolt assembly of the expansion anchor type that employs an improved system for releasably retaining an expansion shell in proper relative relationship to a tapered plug during initial phases of an installation procedure, specifically until the installation of a mine roof support bolt assembly has progressed to the point that the expansion plug has been drawn sufficiently into the hollow interior of the shell to expand the shell into engagement with adjacent portions of the mine roof to secure the shell against rotation relative to the mine roof. Once the shell has been expanded into engagement with the surrounding rock formations, the action of the retaining system is no longer required, and the system is caused to release automatically and in a harmless manner that causes no interference as the installation procedure is completed.

In preferred practice, the retaining system of the referenced Snap Ring Case employs a resilient, commercially available snap ring that can be installed on a rock bolt or on a threaded bar to releasably maintain an expansion shell in proper position during initial phases of an installation procedure. As is described in the referenced Snap Ring Case, a snap ring retainer can be installed onto a threaded end region of the rock bolt or threaded bar—an arrangement that is depicted in the drawings of the present application, and is described herein in conjunction with the preferred practice of the present invention.

While the selection and use of a particular means for retaining an expansion shell in place on a rock bolt or threaded bar is a matter that is outside the scope of the present invention, installation of an expansion shell and plug assembly of the type that embodies features of the present invention is most easily achieved if some type of releasable retainer is employed to hold the shell in place on a bolt or bar as the assembled plug and shell are installed in a drilled hole, and as the plug is initially drawn into the interior of the shell to expand the leaf members of the shell into engagement with surrounding rock formations. Because the use of a resilient snap ring in the manner described in the referenced Snap Ring Case addresses this need in a simple and inexpensive manner, it is appropriate to cross-reference the subject matter of the Snap Ring Case and to incorporate its disclosure herein by reference.

SUMMARY OF THE INVENTION

The present invention addresses the need for a mechanical expansion anchoring system that can be used in combination with resin bond anchoring to anchor relatively large diameter rock bolts or threaded bars in relatively small diameter blind drilled holes, particularly the need for an expansion anchor that can be utilized reliably in combination with resin bond anchoring when a rock bolt or threaded bar having a nominal ⅞" diameter is to be anchored in a blind drilled hole of nominal 1 ⅜" diameter.

The present invention overcomes drawbacks of prior proposals by providing a novel and improved resin reinforced expansion anchor system that utilizes a specially configured, thin-walled expansion shell together with a thin-walled, dual-taper plug for expanding the shell, wherein the shell and the plug cooperate to implement a particularly desirable type of mechanical expansion anchoring action while simultaneously providing a symmetrical array of resin flow passages at circumferentially spaced locations about the anchor assembly to permit proper positioning, distribution and flow of a quick setting resin mix as a relatively large diameter rock bolt or threaded bar is being securely anchored in a blind drilled hole of relatively small diameter, with the anchoring action of the mechanical expansion anchor assembly being desirably augmented by the anchoring action of a concurrently established resin bond.

Stated in another way, the present invention relates to the provision of a specially configured, thin-walled expansion shell and a specially configured, threaded, tapered plug that, acting together, enable an unusually large diameter bolt (e.g., a nominal ⅞" diameter bolt) to be secured in an unusually small diameter blind drilled hole (e.g., a nominal 1 ⅜" diameter hole), as by an effective concurrent implementation of mechanical expansion anchoring together with resin bond anchoring.

In preferred practice, the system of the present invention utilizes a one-piece, four-leaf, thin-walled expansion shell that internally receives a one-piece, dual-taper, thin-walled camming plug, with the plug and the shell cooperating to define an array of resin flow passages that extend longitudinally along the assembled plug and shell, and with the plug and shell having mating spline and groove formations that prevent relative rotation of the plug and shaft, whereby associated segments of the various resin flow passages are maintained in operational alignment so as to permit the establishment of a combined mechanical expansion anchor and resin bond anchor between an end region of a relatively large diameter bolt or threaded bar and such wall formations as surround the end region of the rock bolt or threaded bar to define a relatively small diameter blind drilled hole within which the end region of the rock bolt or threaded bar and the anchor components are positioned.

One feature of an expansion shell that embodies the preferred practice of the present invention resides in the provision of a base ring portion of reduced diameter from which the expansion leaf portions of the shell extend in cantilever fashion—with the reduced diameter of the base ring portion being extended a short distance along the ends of the expansion leaf portions in the regions where the expansion leaf portions join the base ring portion. This reduction in diameter of base end regions of the expansion leaf portions has been found to permit an advantageous type of bending of the expansion leaf portions, whereby these portions that are called upon to deflect radially outwardly as the assembly is "expanded" are permitted to deflect more readily and in a manner that tends to result in minimal breakage.

A further feature of the preferred practice of the present invention resides in the use of an expansion shell and an expander plug, both of which are of generally tubular configuration and have walls that are thinner than is customary with prior proposals. Because the components of the expansion anchor assembly have thinner walls, a capability that the invention provides is the use of larger diameter, stronger rock bolts or threaded bars with drilled holes of a given size. The use both mechanical expansion anchoring and resin bond anchoring with bolts or bars that are installed in accordance with the practice of the present invention likewise enhances strength and safety.

Significant features of the present invention reside in the provision of a specially configured, thin-walled expansion shell and a thin-walled tapered plug that can be utilized with a rock bolt or threaded bar of nominal ⅞" diameter that is inserted into a blind drilled hole of nominal 1 ⅜" diameter, to anchor the bolt or bar therein, with the thin-walled shell and plug having mating groove and spline formations that lock the shell and the plug against relative rotation, and that cooperate when assembled to define a symmetrical array of resin flow passages that extend longitudinally with respect to the expansion anchor assembly to enable proper flows of quick-setting resin that has been mixed in situ in the blind drilled hole to permit the establishment of a proper resin bond anchor concurrently with the implementation of a mechanical expansion anchor of the rock bolt or threaded bar in the blind drilled hole.

BRIEF DESCRIPTION OF THE DRAWINGS

These and other features, and a fuller understanding of the invention may be had by referring to the description and claims that follow, taken in conjunction with the accompanying drawings, wherein:

FIG. 1 is a side elevational view of an expansion anchor assembly that embodies features of the preferred practice of the present invention, with the expansion anchor assembly shown threaded onto a rock bolt, and with portions of the elongate body of the rock bolt being foreshortened;

FIG. 2 is a sectional view thereof, as seen from a plane indicated by a line 2—2 in FIG. 1, with all components except for the bolt itself being shown in cross section;

FIG. 3 is a top plan view thereof;

FIG. 4 is an exploded perspective view of an expansion shell and a threaded, tapered plug that form the expansion anchor assembly;

FIGS. 5 and 6 are top and bottom plan views, respectively, of the expansion shell;

FIGS. 7 and 8 are top and bottom plan views, respectively, of the threaded, tapered plug;

FIGS. 9 and 10 are perspective views of the assembled shell and plug components with the plug serving to expand portions of the shell, with the view of FIG. 9 having the shell and the plug oriented to correspond with the showings of these components in FIG. 4, but with the view of FIG. 10 having these components rotated 90 degrees with respect to said orientation; and, FIGS. 11, 12, 13 and 14 are sectional views similar to FIG. 2 but depicting a typical sequence of relative component orientations that occur as the expansion anchor assembly and the rock bolt of FIG. 1 are installed in a blind drilled hole together with a conventional dual-component resin cartridge that is ruptured during installation to permit mixing and distribution of resin as the expansion anchor is positioned, expanded and brought into anchoring relationship with rock formations that surround the blind drilled hole.

DESCRIPTION OF THE PREFERRED EMBODIMENT

Figure 11:
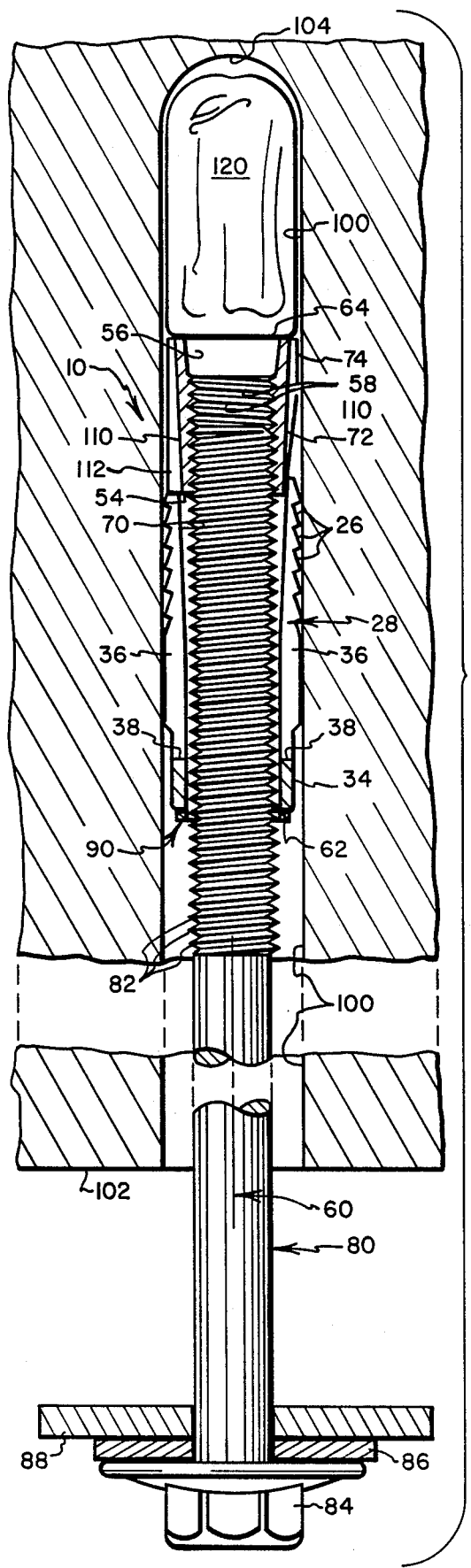

Referring to FIGS. 1-4, an expansion anchor assembly that embodies features of the preferred practice of the present invention is indicated generally by the numeral 10. The expansion anchor assembly 10 is formed from a pair of interfitting, generally tubular components 20, 40 that extend substantially coaxially along an imaginary line 60 that will be referred to as a "center axis."

As will be explained in greater detail, the interfitting components 20, 40 comprise what is referred to by those skilled in the art as an "expansion shell" and a "threaded, tapered plug." The expansion shell 20 and the tapered plug 40 define engageable tapered wedge surfaces 22, 42, respectively, that are of generally truncated-conical configuration. The tapered surfaces 22, 42 cooperate to effect radially outward deflection of four leaf portions 24 of the shell 20 as the plug 40 is drawn progressively farther into the interior of the expansion shell 20. As the four leaf members 24 of the expansion shell 20 are caused to be deflected radially outwardly with respect to the center axis 60, the effective outer diameter of the expansion shell 20 is increased, and toothed outer surface formations 26 that are provided on the leaf members 24 are forced radially outwardly to grip surrounding materials.

As will also be explained in greater detail, the expansion anchor assembly 10 is intended to be threaded onto what is known to those skilled in the art of mining and excavating as a "rock bolt" or a "threaded bar." The term "rock bolt" normally is used to refer to an elongate, hot-rolled bar, such as the rock bolt 80 shown in foreshortened form in FIGS. 11-14, having cold-rolled or machine-cut threads 82 that extend along one end region for threadedly engaging an expansion anchor assembly such as the assembly 10, and having an enlarged head formation 84 at the other end region thereof. The term "threaded bar" normally is used to refer to an elongate bar (not shown), both ends of which are threaded, one for use with a threaded nut (not shown), and the other for threadedly engaging an expansion anchor assembly such as the assembly 10.

FIGS. 11-14 show the expansion anchor assembly 10 as it is being installed in a blind drilled hole 100, with the assembly 10 being threaded onto the threaded upper end region 82 of the rock bolt 80. For the sake of simplicity, the expansion anchor assembly 10 will be described and depicted only as it typically is used with the rock bolt 80, with a flat washer 86 being installed on the rock bolt 80 adjacent the bolt head 84, and with the rock bolt 80 extending through a hole formed in a conventional support plate 88, as is best seen in FIGS. 11-14 However, as will be understood by those skilled in the art, the utility of the present invention is not limited to use with rock bolts; rather features of the invention can be utilized with other forms of elongate, threaded fasteners such as threaded bars and the like.

Figure 13:
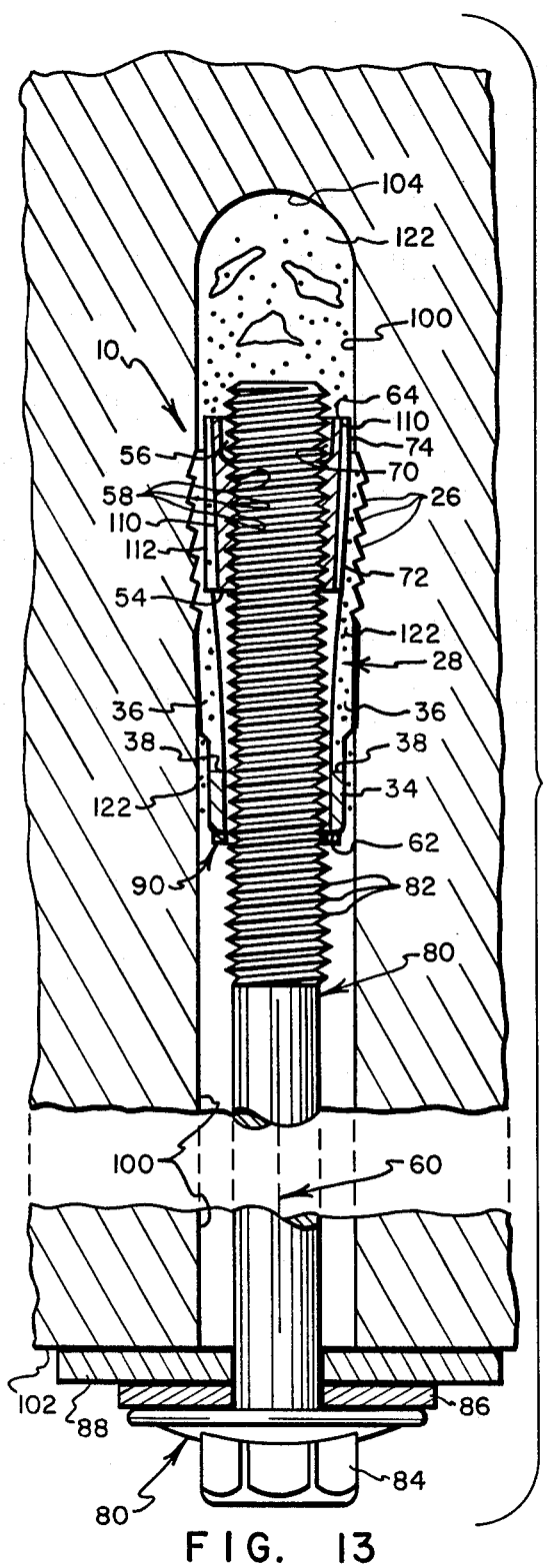
Figure 14:
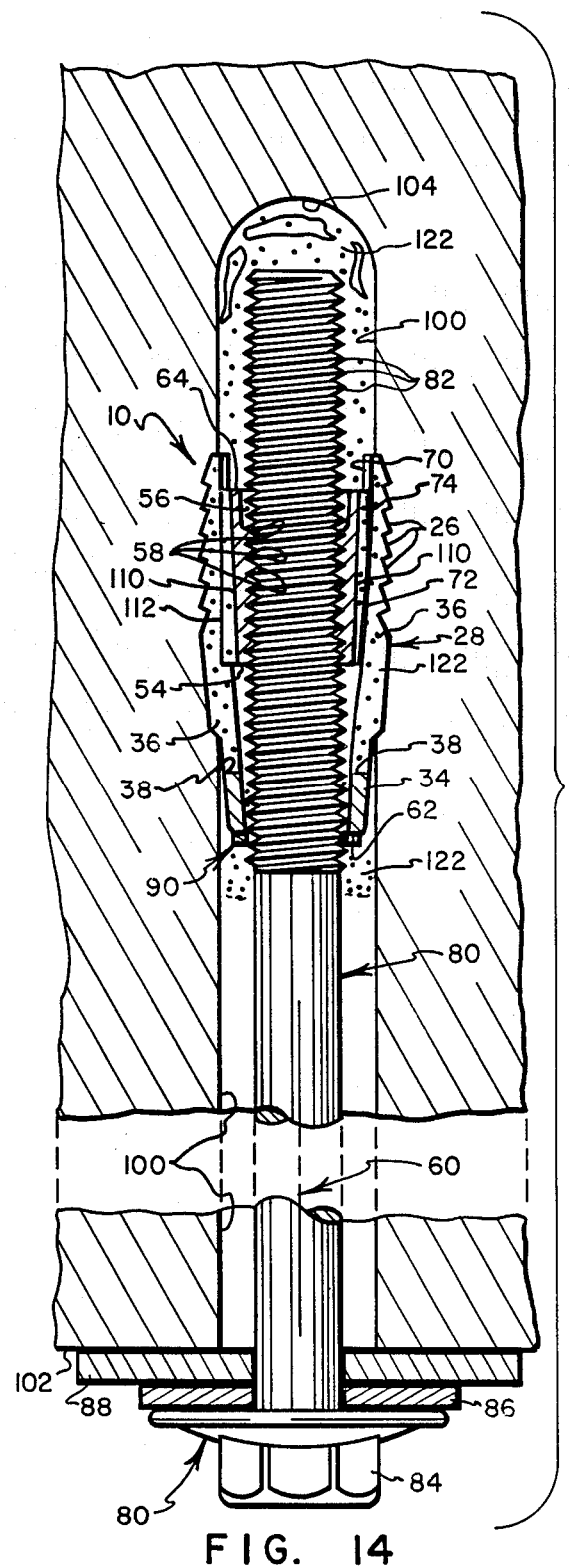

In order to hold the expansion shell 20 in properly assembled position on the rock bolt 80 (at a position adjacent to and in contact with the tapered plug 40) during initial phases of installation of the expansion assembly 10 and the rock bolt 80 into the blind drilled hole 100, a suitable retaining device preferably is installed on the rock bolt 80 to releasably engage the expansion shell 20. In FIGS. 1, 2, and 11-14, such a retaining device is depicted as taking the form of a four conventional, commercially available snap ring 90 that is pressed onto the threaded end region 82 of the rock bolt 80 at a location adjacent the base of the expansion shell 20 so as to serve as a stop that prevents unintentional downward movement of the sleeve 20 along the body of the bolt 80. FIGS. 13 and 14 depict how the snap ring 90 can move axially along the rock bolt 80 as the need for its retaining function is outlived once initial phases of an installation procedure have been carried out. Other features of the use of a snap ring retainer 90 are described more fully in the referenced Snap Ring Case. Also present in the referenced Snap Ring Case is a discussion of the use of other forms of retaining devices. While the snap ring 90 is shown installed directly on the threaded end region of the rock bolt 80, as is described and illustrated in the referenced Snap Ring Case, specially configured formations such as projections, grooves, ribs and the like (not shown) can be provided on the rock bolt 80 to cooperate with or substitute for the snap ring 90.

Turning now to a more detailed description of features of the expansion anchor assembly 10, the expansion shell 20 and the plug 40 are a pair of one-piece structures that are formed as separate castings from a suitable material such as malleable iron that conforms to American Society for Testing and Materials (ASTM) Specification A47, Grade 32510. Both the shell 20 and the plug 40 have maximum "normal" (i.e., "unexpanded") outer diameter dimensions that are about 3/32" less than the nominal inner diameter of a blind drilled hole 100 into which the expansion anchor assembly 10 is to be installed. By way of example, in an application where an expansion anchor assembly 10 is to be utilized to anchor a bolt or threaded bar having a nominal diameter of ⅞" in a blind drilled hole having an inner diameter of 1 ⅜ inches, the maximum outer diameter dimension of the shell 20 and the plug 40 is selected to be about 1 9/32".

The shell 20 and the plug 40 extend substantially coaxially about the center axis 60, and cooperate when in assembled engagement to give the expansion anchor assembly 10 a configuration that is generally cylindrical about the center axis 60. This generally cylindrical assembly 10 extends between opposed ends that are designated in FIGS. 9 and 10 by the numerals 62, 64. The end 62 is an annular surface that is formed on the base of the expansion shell 20. The end 64 is an annular surface that extends about the large diameter end of the expander plug 40. The opposed ends 62, 64 of the expansion assembly 10 extend in spaced parallel planes that are perpendicular to the center axis 60.

The shell 20 has inwardly facing, inclined surface segments 70 that define portions of a truncated conical taper. Likewise, the plug 40 has an outwardly facing inclined surface with segments 72, 74 that define portions of two differently inclined truncated conical tapers. Normally the surface segments 70, 72 are in engagement when the shell 20 and the plug 40 are assembled.

Referring to FIGS. 4-6, the shell 20 is a generally cylindrical one-piece structure which has formations that extend axially, radially, and circumferentially with respect to the center axis 60. Among the formations of the shell 20 is a ring-like base portion that is designated by the numeral 30. The base 30 has substantially uniform inner and outer diameters that are indicated in FIG. 6 by the designations $SD_I$ and $SD_O$, respectively. Also among the formations of the shell are the four elongate leaf members 24 that extend axially upwardly in cantilever fashion from the ring-like base 30.

A feature of the shell 20 resides in the character of a unique combination of structural features that enables the shell 20 to assume an unusually thin-walled character while maintaining its structural and functional integrity. Conventional wisdom and practice call for expansion shells of expansion anchor assemblies that are used in heavily loaded mine roof support applications and the like to be formed from material that has relatively thick walls—and which therefore requires the use of relatively large diameter blind drilled holes in which to mount the resulting expansion anchor assemblies.

Conventional wisdom and practice militates against the use of a base ring portion (such as the base ring portion 30) which has a lesser diameter than that which serves as the maximum outer diameter of the unexpanded shell; however, expansion shells that embody the preferred practice of the present invention have a reduced outer diameter portion 34 that not only extends about the entire circumference of the base ring 30, but also includes lower end region portions of the leaf members 24. Conventional wisdom and practice militates against the use of separator slots 36 that "bottom out" (as is indicated by the numerals 38) near the end surface 62 without having at least an enlarged diameter ring of rigidifying material encircling the base ring 30 at a location between the bottoms 38 of the separator slots 36 and the end surface 62—which practice is not followed by the design of the expansion sleeve 20 inasmuch as the reduced diameter portion 34 extends from the end surface 62 to include the vicinities of the bottoms 38 of the separator slots 36. Not only have tests shown that these reductions of base ring material do not deleteriously affect the function of the shells 20, but also that the reduction in thickness of the base ring material 30 is important to achieving a proper flow of bonding resin about the anchor assemblies 10 during installation where a resin bond anchor is being formed concurrently with the establishment of a mechanical expansion anchor, as will be explained in greater detail.

The elongate leaf members 24 are four in number. The use of precisely four radially deformable leaf members 24 has been found to be of importance to the preferred practice of the present invention because, by providing four radially deflectable members, a relatively uniform application of stress is applied to the thin-walled base ring material 30 as the leaf members 24 are caused to deflect radially outwardly under the wedging influence of the expander plug 40—and yet, by providing no more than four leaf members 24, strong connections can be maintained between the leaf members 24 and the base ring 30 to prevent severance of the leaf members 24 from the base ring 30. Still further, the provision of exactly four equally spaced, identically configured, symmetrically arranged leaf members 24 results in the provision of exactly four separator slots 36 between the leaf members 24, with the separator slots 36 likewise being of equal size, of equal spacing and symmetrically arranged, whereby the slots 36 provide properly spaced, symmetrically arranged resin flow path portions, to distribute bonding resin along side portions of the expansion anchor assembly 10.

As is shown in FIGS. 4-6, the leaf members 24 are of generally arcuate cross-section as viewed from planes that extend perpendicular to the center axis. As is best seen in FIG. 2, the leaf members maintain a substantially uniform cross-section along about the bottom halves of their lengths, i.e., from their juncture with the base ring 30 to positions that are indicated generally by numerals 28 where the leaf members 24 begin to diminish in cross section to form wedgelike structures bounded on their inner surfaces by the inclined surface portions 70, and on their outer surfaces by the tooth shaped formations 26.

The expander plug 40 has something of a stopper-shaped appearance, with the upper end surface 64, a lower end surface 54, and the tapered outer surface portions 72, 74 that interconnect the upper and lower ends 64, 54. Additionally, a hole 56 is provided in the plug 40 that extends along the center axis 60 and opens through the upper and lower ends 64, 54. As is best seen in the sectional view of FIG. 2, the hole 56 is provided with threads 58 that extend along a portion of the length of the hole 56.

The configuration of the tapered outer wall portions 72, 74 of the expander plug 40 is a feature of importance to the preferred practice of the present invention. What can be referred to as a "dual-taper" is defined by the outer surface segments 72, 74 to define a relatively steeply tapered portion 72 that joins with the lower end surface 54, and a relatively gently tapered portion 74 that joins with the upper surface 64. The steeply tapered portion 74 of the outer surface extends for a distance equal to about two-thirds of the length of the expander plug 40; accordingly, the gentle tapered portion 72 occupies only about one-third of the length of the expander plug 40. The steeply tapered portion 74 effects about four-fifths (i.e., about 80 percent) of the taper of the plug 40, while the gently tapered portion 72 effects only about one-fifth (i.e., about 20 percent) of the taper of the plug 40. By this arrangement, as the expander plug 40 is drawn into the hollow interior of the shell 20, the leaf members 24 are caused to deflect radially outwardly relatively quickly in response to their being contacted by the relatively steep taper 74; however, as is illustrated in FIG. 14, once the gentle taper 72 is drawn into the hollow interior of the shell 20, very little additional radial deflection of the leaf members 24 takes place, whereby the surface area of the more gentle taper 72 serves primarily as a support for permanent positioning of the deflected leaf members 24.

A plurality of groove-like indentations 110 are formed along the outer surface of the plug 40. These groove-like indentations 110 align with the separator slots 36 that separate the leaf members 24, and cooperate with the slots 36 to provide resin flow passages that extend in a symmetrically arranged array along the sides of the expansion anchor assembly 10 to provide for free flow of bonding resin as is needed to effect a proper resin bond anchor.

In order to keep the groove-like indentations 110 in proper communicating alignment with the slots 36, a radially outwardly extending rib or spline 112 is formed on the expander plug 40 and projects from the base of one of the groove-like indentations 110. The rib or spline 112 is of relatively narrow cross-section so as to not significantly block the flow of resin along its associated groove-like indentation 110, or along its associated slot 36; however, if the plug 40 and the shell 20 should start to rotate relative to each other about the axis 60 during installation of the expansion anchor assembly 10, the rib or spline 112 will engage an edge surface of one of the adjacent leaf members 24 to quickly bring such attempted relative rotation to a halt.

How the system of the preferred practice of the present invention behaves during installation and anchoring of the mine roof support bolt 80 is best understood by referring to FIGS. 11-14 wherein sequential stages of installation of the expansion anchor assembly 10 and the rock bolt 80 in a blind drilled hole 100 formed in a mine roof 102 are depicted. FIG. 11 shows the expansion anchor assembly 10 in position on the threaded end region 82 of the rock bolt 80 as the assembly 10 is being inserted together with the rock bolt 80 into the blind drilled hole 100 behind a conventional dual compartment cartridge 120 of resin ingredients. Once the relative arrangement of components shown in FIG. 11 is achieved, the time is at hand to rotate the bolt 80 and the expansion anchor assembly 10, and to axially compress the expansion anchor assembly 10 into engagement with the resin cartridge 120 so that the walls of the cartridge 120 are ruptured, the resin ingredients therein are released and are discharged into the drilled hole 100, and mixing of the ingredients is effected as rapidly as possible.

Because the resin ingredients that discharge from the ruptured cartridge 120 mix to form a very fast acting resin which will "set" within a matter of seconds after being mixed, it is important that the remainder of the installation and anchoring procedure be carried out quickly and easily. The flow passages that are defined along the sides of the expansion anchor assembly 10 by the indentations, the slots, and the reduced diameter region that extends about the base ring 30 of the shell 20 permit a properly metered but not-unduly restricted flow of resin about the expansion anchor assembly 10 and into portions of the drilled hole 100 where a suitable resin bond anchor is formed between the rock formations that define the drilled hole 100 and the described members that are inserted into the hole 100.

Figure 12:
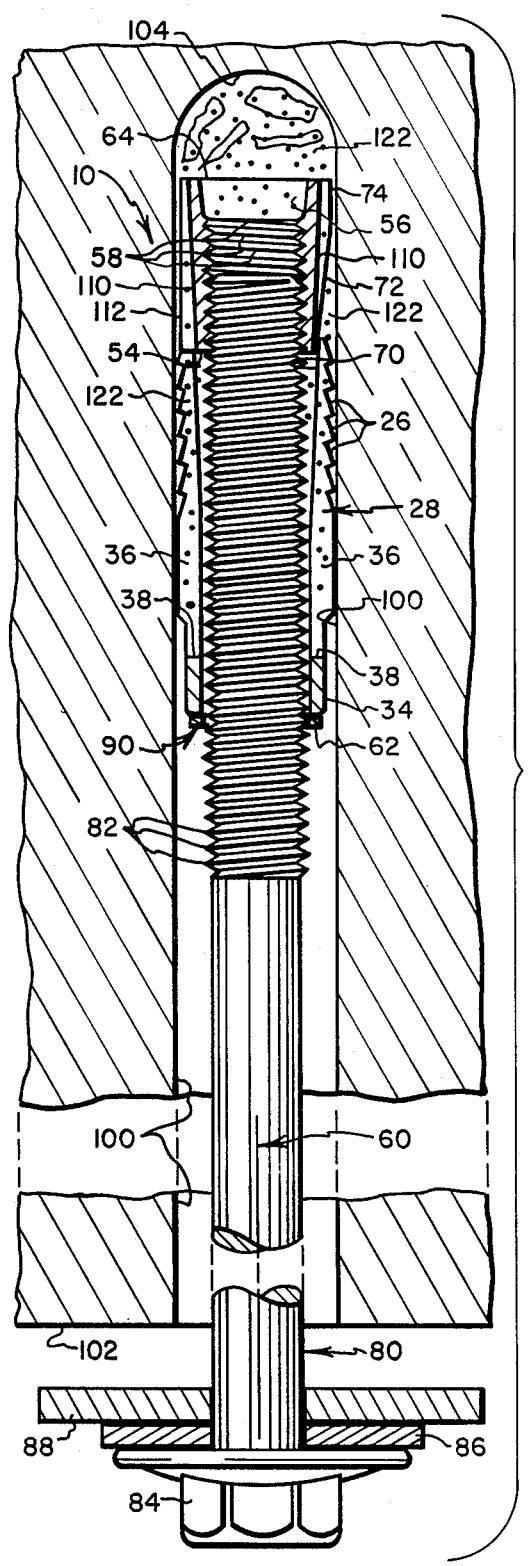

FIG. 12 shows the expansion anchor assembly 10 and the rock bolt 80 as these elements are being pushed upwardly into the hole 100 at a time after the resin cartridge 120 has burst, it being understood that, during this period of time, the rock bolt 80 and the expansion anchor assembly 10 are preferably being rotated to effect mixing and distribution of the resin ingredients. Referring to FIGS. 12-14, resin 122 from the disintegrated cartridge 120 is mixed in situ and is distributed about the expansion anchor assembly 10 and about upper end region portions of the rock bolt 80, whereafter the viscous liquid resin flows downwardly about the tapered plug and along the described resin flow passages.

FIG. 13 shows the expansion anchor assembly 10 during the process of drawing the tapered plug 40 into the interior of the expansion shell 20, whereby the leaf members 24 of the expansion shell 20 are caused to deflect radially outwardly into clamping engagement with the rock formations that define the walls of the blind drilled hole 100. FIG. 14 shows the expansion anchor assembly 10 in its fully installed position wherein the tapered plug 40 has been drawn into the interior of the expansion shell 20 to the degree that surrounding rock formations will permit as expansion of the shell 20 to take place. When the rock bolt 80 has been threaded sufficiently far into the tapered plug 40 to cause the headed end 84 of the rock bolt 80 to clampingly engage the washer 86 which, in turn, engages and clamps the support plate 88 into engagement with the mine roof 102, the installation is completed.

As will be apparent from the foregoing description, the present invention provides a novel and improved system for establishing a resin reinforced mechanical expansion anchor for a mine roof support bolt or the like, wherein a specially configured, thin-walled expansion shell is employed together with a thin-walled, dual-taper plug for expanding the shell. The shell and the plug cooperate to implement a particularly desirable type of mechanical expansion anchoring action while simultaneously providing a symmetrical array of resin flow passages at circumferentially spaced locations about the anchor assembly to permit proper distribution and flow of a quick setting resin mix. The system of the invention enables a relatively large diameter rock bolt or threaded bar to be securely anchored in a blind drilled hole that is of relatively small diameter, with the anchoring action of a mechanical expansion anchor assembly being desirably augmented by the anchoring action of a concurrently established resin bond. And, as has been emphasized, the system of the present invention has particular utility in providing a means for effecting combined mechanical expansion anchoring and resin bond anchoring of a relatively large diameter threaded member such as a ⅞" rock bolt that is installed in a relatively small diameter hole such as a 1 ⅜" blind drilled hole that is formed in a mine roof or the like.

Although the invention has been described in its preferred from with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims whatever features of patentable novelty exist in the invention disclosed.

What is claimed is:

1. An expansion anchor assembly formed from a pair of thin-walled components that extend coaxially about a common center axis to form a generally cylindrical assembly that is installable on a threaded end region of an elongate member and that responds to rotation of the elongate member relative to the expansion anchor assembly to expand the expansion anchor assembly in generally radial directions relative to the center axis, comprising:

(a) a one-piece expansion shell having:
(i) a ring-like base portion with a hole formed centrally therethrough, with the hole extending coaxially about a center axis and having an inner diameter that is selected to slip-fit about a threaded end region of an elongate member onto which the expansion anchor assembly is to be installed, with the ring-like base portion having a substantially constant outer diameter that extends coaxially about the center axis, and with the distance between the inner diameter and the outer diameter defining the wall thickness of the base portion, which wall thickness is substantially uniform along the axial length of the base portion;
(ii) a plurality of elongate expansion leaf portions that are formed integrally with the base portion and that extend in length in a common direction from the base portion along the center axis, with the leaf portions all having cross-sections that are substantially the same when viewed from any selected imaginary plane that extends perpendicular to the center axis and intersects the plurality of leaf portions, with each of said cross-sections being bounded by a curved inner surface, a curved outer surface, and a pair of edge surfaces that connect the inner curved surface with the outer curved surface, with said inner curved surfaces of the leaf portions extending substantially along and forming substantially arcuate segments of a common imaginary inner circle, with said outer curved surfaces of the leaf portions extending substantially along and forming substantially arcuate segments of a common imaginary outer circle, with said inner circle and said outer circle extending in said imaginary plane and being concentric about the center axis, and with the distance between said inner circle and said outer circle defining the wall thickness of the leaf portions as measured within said imaginary plane in a direction that is radial relative to the center axis;
(iii) the leaf portions being substantially equally spaced about the center axis, with each of the leaf portions being substantially equally spaced from adjacent ones of the leaf portions, whereby distances between adjacent edge surfaces of adjacent ones of the leaf portions are substantially equal along the lengths of the leaf portions except in the vicinities of the junctures of the leaf portions with the base portion wherein adjacent edge surfaces of adjacent leaf portions curve smoothly toward each other and cooperate to define contiguous junctures of generally U-shaped configuration, with the spaces between adjacent ones of the edge surfaces defining separator slots that separate adjacent ones of the leaf portions, and with the U-shaped junctures of the adjacent edge surfaces defining end regions of the separator slots;

(iv) the wall thicknesses and the relative inner and outer diameters of the base portion and of the leaf portions being configured such that:

(A) the leaf portions have a substantially uniform inner diameter region that extends about half way along the axial lengths of the leaf portions as measured from the junctures of the leaf portions with the base portion wherein the uniform inner diameter of the leaf portions contiguously joins and is equal to the inner diameter of the base portion, with said uniform inner diameter region extending contiguously along the inner curved surfaces of the leaf portions to a position about midway along the axial lengths of the leaf portions at which location a smooth transition is made from said uniform inner diameter region to a non-uniform inner diameter region characterized by an inner diameter of the leaf portions that progressively and smoothly increases in proportion to an increase in distance along the center axis from the base portion, with inwardly facing surfaces of the leaf portions within said region of non-uniform diameter defining segments of an inwardly facing tapered wall surface of generally frustoconical form;

(B) the leaf portions have curved outer surfaces that prescribe a substantially uniform maximum outer diameter along their axial lengths except in regions of the juncture of the leaf portions with the base portion, wherein the end regions of the leaf portions cooperate with the base portion to define a region of reduced outer diameter, with the region of reduced outer diameter encompassing the end regions of the separator slots, and with the difference in diameters between the maximum outer diameter and the reduced outer diameter being sufficient to permit liquid to flow from the end regions of the separator slots and about the region of reduced diameter before, during and after the expansion shell is expanded in a blind drilled hole;

(C) the leaf portions each having a region of maximum wall thickness located immediately above the region of reduced outer diameter, with the wall thickness therein being defined by said uniform inner diameter and said maximum outer diameter; and, (D) the curved outer surfaces and the inwardly facing tapered wall surfaces of the leaf portions being joined by end formations that define tapered edges which point in directions extending along the center axis away from the base portion;

(b) a one-piece expander plug having:

(i) a tapered, generally tubular structure having a tapered outer surface with portions thereof being of generally frustoconical configuration, with the tapered outer surface increasing progressively in diameter as it extends between a relatively small diameter end surface and a relatively large diameter end surface, with the small diameter end surface being of sufficiently small diameter to permit adjacent portions of the tapered outer surface to fit between the tapered edges of the end formations of the leaf portions of the expansion shell, with the large diameter end surface being of sufficiently large diameter to enable the tapered outer surface to effect radially outward deflection of the leaf portions of the expansion shell when the expander plug is moved along the center axis among the leaf portions toward the base portion of the expansion shell to expand the expansion anchor assembly;

(ii) a length that is determined by the distance measured along the center axis between the large diameter end surface and the small diameter end surface, with the length of the expander plug being equal to about one half of the length of the leaf portions of the expansion shell;

(iii) an effective overall taper that is determined by the difference in diameter between the diameters of the large diameter end region and the small diameter end region, and wherein:

(A) the tapered surface of the expander plug has first and second tapered regions formed thereon, with each of the first and second tapered regions being of frustoconical configuration, with each of the frustoconical configurations of the first and second tapered regions extending coaxially with respect to the center axis;

(B) the first tapered region extending from the small diameter end region of the expander plug to a position as measured along the center axis of about ⅔ of the length of the expander plug;

(C) the second tapered region extending from the large diameter end region of the expander plug to a position as measured along the center axis of about ⅓ of the length of the expander plug;

(D) a smoothly rounded line of juncture being formed where the first tapered region joins the second tapered region;

(E) the slope of the first tapered region relative to the center axis being selected such that the first tapered region effects about 4/5 of the change in diameter defined as the effective overall taper of the expander plug;

(F) the slope of the second tapered region relative to the center axis being selected such that the second tapered region effects about 1/5 of the change in diameter defined as the effective overall taper of the expander plug;

(G) whereby the first and second tapered regions define a dual-taper on the tapered outer surface of the expander plug that cooperates with the leaf portions of the expansion shell to effect a relatively rapid initial radial expansion of the expansion shell as by causing a relatively quick-acting deflection of the leaf members radially outwardly with respect to the center axis when the expander plug is moved initially along the center axis among the leaf portions toward the base portion;

(iv) a plurality of groove-like recesses extending axially along the tapered outer surface of the expander plug and being arranged to align with the separator slots that are defined between the leaf portions of the expansion shell for cooperating with the separator slots and the reduced diameter portion of the expansion shell to provide an array of fluid flow passages that are operative to permit liquid resin to flow from a position adjacent the large diameter end surface of the expander plug alongside the expander plug and among the leaf portions of the expansion shell for delivery onto the reduced diameter portion of the expansion shell; and, (c) cooperating formation means defined on the expander plug and on the expansion shell for maintaining alignment of the groove-like recesses and the spacer slots as the expander plug is moved axially relative to the expansion shell to radially expand portions of the expansion shell.

2. A method for anchoring an elongate threaded member to a rock formation, comprising the steps of:

(a) providing an elongate member having a threaded end region that is to be anchored to a rock formation, with the member having a desired nominal diameter;

(b) providing an expansion anchor assembly for threading onto the threaded end region, with the expansion anchor assembly including an expansion shell and an expander plug for expanding the shell, and with the expansion shell and the expander plug having relatively thin wall portions so as to fit within a drilled hole of a diameter that is minimally greater than the nominal diameter of the elongate member;

(c) the step of providing the expansion anchor assembly including the step of providing a plurality of passage formations on the expansion shell and on the expander plug that are alignable to define a plurality of resin flow passages that extend along and among the components of the expansion anchor assembly, and including the step of providing the expansion shell and the expander plug with interfitting formations for maintaining alignment of said passage formations during expansion of the expansion anchor assembly;

(d) forming a blind drilled hole in the rock formation, with the hole having a diameter that is no greater than is necessary to permit insertion of the expansion anchor assembly therein;

(e) inserting an adhesive material into the blind drilled hole formed in the rock formation, with the adhesive material being of a quick-setting type in that it "sets" within a few seconds of the time that its ingredients are mixed;

(f) advancing the elongate threaded member into the blind drilled hole with the expansion anchor assembly carried on the threaded member;

(g) manipulating the elongate threaded member and the expansion anchor assembly carried thereon to effect movement of the adhesive material within the blind drilled hole to mix and distribute the adhesive material in the blind drilled hole; and, (h) causing the mixed adhesive material to flow about the elongate threaded member and about the expansion anchor assembly along the flow paths defined by the passage formation means while rotating the elongate threaded member to effect expansion of the expansion anchor assembly in the blind drilled hole to concurrently establish both a mechanical expansion anchoring and a resin bond anchoring of the elongate threaded member to the rock formation.

3. The method of claim 2 wherein the step of providing an expansion anchor assembly includes providing an expansion anchor assembly having pair of thin-walled components that extend coaxially about a common center axis to form a generally cylindrical assembly that is installable on a threaded end region of an elongate member and that responds to rotation of the elongate member relative to the expansion anchor assembly to expand the expansion anchor assembly in generally radial directions relative to the center axis, comprising:

(a) a one-piece expansion shell having:

(i) a ring-like base portion with a hole formed centrally therethrough, with the hole extending coaxially about a center axis and having an inner diameter that is selected to slip-fit about a threaded end region of an elongate member onto which the expansion anchor assembly is to be installed, with the ring-like base portion having a substantially constant outer diameter that extends coaxially about the center axis, and with the distance between the inner diameter and the outer diameter defining the wall thickness of the base portion, which wall thickness is substantially uniform along the axial length of the base portion;

(ii) a plurality of elongate expansion leaf portions that are formed integrally with the base portion and that extend in length in a common direction from the base portion along the center axis, with the leaf portions all having cross-sections that are substantially the same when viewed from any selected imaginary plane that extends perpendicular to the center axis and intersects the plurality of leaf portions, with each of said cross-sections being bounded by a curved inner surface, a curved outer surface, and a pair of edge surfaces that connect the inner curved surface with the outer curved surface, with said inner curved surfaces of the leaf portions extending substantially along and forming substantially arcuate segments of a common imaginary inner circle, with said outer curved surfaces of the leaf portions extending substantially along and forming substantially arcuate segments of a common imaginary outer circle, with said inner circle and said outer circle extending in said imaginary plane and being concentric about the center axis, and with the distance between said inner circle and said outer circle defining the wall thickness of the leaf portions as measured within said imaginary plane in a direction that is radial relative to the center axis;

(iii) the leaf portions being substantially equally spaced about the center axis, with each of the leaf portions being substantially equally spaced from adjacent ones of the leaf portions, whereby distances between adjacent edge surfaces of adjacent ones of the leaf portions are substantially equal along the lengths of the leaf portions except in the vicinities of the junctures of the leaf portions with the base portion wherein adjacent edge surfaces of adjacent leaf portions curve smoothly toward each other and cooperate to define contiguous junctures of generally U-shaped configuration, with the spaces between adjacent ones of the edge surfaces defining separator slots that separate adjacent ones of the leaf portions, and with the U-shaped junctures of the adjacent edge surfaces defining end regions of the separator slots;

(iv) the wall thicknesses and the relative inner and outer diameters of the base portion and of the leaf portions being configured such that:

(A) the leaf portions have a substantially uniform inner diameter region that extends about half way along the axial lengths of the leaf portions as measured from the junctures of the leaf portions with the base portion wherein the uniform inner diameter of the leaf portions contiguously joins and is equal to the inner diameter of the base portion, with said uniform inner diameter region extending contiguously along the inner curved surfaces of the leaf portions to a position about midway along the axial lengths of the leaf portions at which location a smooth transition is made from said uniform inner diameter region to a non-uniform inner diameter region characterized by an inner diameter of the leaf portions that progressively and smoothly increases in proportion to an increase in distance along the center axis from the base portion, with inwardly facing surfaces of the leaf portions within said region of non-uniform diameter defining segments of an inwardly facing tapered wall surface of generally frustoconical form;

(B) the leaf portions have curved outer surfaces that prescribe a substantially uniform maximum outer diameter along their axial lengths except in regions of the juncture of the leaf portions with the base portion, wherein the end regions of the leaf portions cooperate with the base portion to define a region of reduced outer diameter, with the region of reduced outer diameter encompassing the end regions of the separator slots, and with the difference in diameters between the maximum outer diameter and the reduced outer diameter being sufficient to permit liquid to flow from the end regions of the separator slots and about the region of reduced diameter before, during and after the expansion shell is expanded in a blind drilled hole;

(C) the leaf portions each having a region of maximum wall thickness located immediately above the region of reduced outer diameter, with the wall thickness therein being defined by said uniform inner diameter and said maximum outer diameter; and, (D) the curved outer surfaces and the inwardly facing tapered wall surfaces of the leaf portions being joined by end formations that define tapered edges which point in directions extending along the center axis away from the base portion;

(b) a one-piece expander plug having:

(i) a tapered, generally tubular structure having a tapered outer surface with portions thereof being of generally frustoconical configuration, with the tapered outer surface increasing progressively in diameter as it extends between a relatively small diameter end surface and a relatively large diameter end surface, with the small diameter end surface being of sufficiently small diameter to permit adjacent portions of the tapered outer surface to fit between the tapered edges of the end formations of the leaf portions of the expansion shell, with the large diameter end surface being of sufficiently large diameter to enable the tapered outer surface to effect radially outward deflection of the leaf portions of the expansion shell when the expander plug is moved along the center axis among the leaf portions toward the base portion of the expansion shell to expand the expansion anchor assembly;

(ii) a length that is determined by the distance measured along the center axis between the large diameter end surface and the small diameter end surface, with the length of the expander plug being equal to about one half of the length of the leaf portions of the expansion shell;

(iii) an effective overall taper that is determined by the difference in diameter between the diameters of the large diameter end region and the small diameter end region, and wherein:

(A) the tapered surface of the expander plug has first and second tapered regions formed thereon, with each of the first and second tapered regions being of frustoconical configuration, with each of the frustoconical configurations of the first and second tapered regions extending coaxially with respect to the center axis;

(B) the first tapered region extending from the small diameter end region of the expander plug to a position as measured along the center axis of about ⅔ of the length of the expander plug;

(C) the second tapered region extending from the large diameter end region of the expander plug to a position as measured along the center axis of about ⅓ of the length of the expander plug;

(D) a smoothly rounded line of juncture being formed where the first tapered region joins the second tapered region;

(E) the slope of the first tapered region relative to the center axis being selected such that the first tapered region effects about 4/5 of the change in diameter defined as the effective overall taper of the expander plug;

(F) the slope of the second tapered region relative to the center axis being selected such that the second tapered region effects about 1/5 of the change in diameter defined as the effective overall taper of the expander plug;

(G) whereby the first and second tapered regions define a dual-taper on the tapered outer surface of the expander plug that cooperates with the leaf portions of the expansion shell to effect a relatively rapid initial radial expansion of the expansion shell as by causing a relatively quick-acting deflection of the leaf members radially outwardly with respect to the center axis when the expander plug is moved initially along the center axis among the leaf portions toward the base portion;

(iv) a plurality of groove-like recesses extending axially along the tapered outer surface of the expander plug and being arranged to align with the separator slots that are defined between the leaf portions of the expansion shell for cooperating with the separator slots and the reduced diameter portion of the expansion shell to provide an array of fluid flow passages that are operative to permit liquid resin to flow from a position adjacent the large diameter end surface of the expander plug alongside the expander plug and among the leaf portions of the expansion shell for delivery onto the reduced diameter portion of the expansion shell; and, (c) cooperating formation means defined on the expander plug and on the expansion shell for maintaining alignment of the groove-like recesses and the spacer slots as the expander plug is moved axially relative to the expansion shell to radially expand portions of the expansion shell.

4. An expansion anchor assembly in combination with a dual compartment resin and cartridge inserted into a mine roof opening, the anchor assembly including
(a) an elongated bolt having a head at one end and threaded for a portion of its length at the other end;
(b) an expansion member engaged with the threaded end of said bolt;
(c) said expansion member including an expansion shell having a plurality of leaf segments;
(d) a first means for engaging said expansion shell with said elongated bolt;
(e) a wedge threaded on said elongated bolt for engagement with said expansion shell to urge the latter into gripping engagement with the mine roof;
(f) a first resin passageway means on the outer surface of said wedge for permitting resin to gravitate therethrough;
(g) the leaf segments of said expansion shell being separated to form a second resin passageway means aligned with said first resin passageway means, whereby resin may gravitate downwardly through substantially the entire length of said assembly, and
(h) a second means within said first passageway and engageable with one of said leaf segments to prevent relative rotation of said wedge member with respect to said expansion shell;
(i) said resin being mixed upon rotation of said bolt and expansion member and gravitating downwardly through the first and second passageway means into engagement with that portion of the mine roof defining the mine roof opening.

5. The expansion anchor assembly of claim 4, wherein
(a) said expansion shell is of generally cylindrical shape and includes four leaf segments arranged in laterally spaced relationship thereby forming separator slots comprising said second resin passageway means, and
(b) a base ring connecting one end of said leaf segments together.

6. The expansion anchor assembly of claim 4, wherein (a) said first means comprises a snap ring pressed onto the threaded portion of said elongated bolt at a location adjacent the base of said expansion shell to prevent accidental movement of the latter relative to said elongated bolt.

7. The expansion anchor assembly of claim 4, wherein
(a) said first resin passageway comprises a plurality of spaced groove-like indentations formed on the outer surface of said wedge and coextensive with the length thereof.

8. The expansion anchor assembly of claim 4, wherein
(a) said second means comprises a rib positioned in said first resin passageway, a portion of said rib extending outwardly beyond the outer periphery of said wedge between adjacent spaced leaf segments, whereby relative rotational movement of said wedge and expansion shell is prevented.

9. The expansion anchor assembly of claim 8, wherein
(a) said first resin passageway comprises a plurality of spaced groove-like indentations formed on the outer surface of said wedge and coextensive with the length thereof, and
(b) said rib is positioned centrally of one of said groove-like indentations and is substantially coextensive therewith, thereby providing resin passageway portions within said indentation on opposite sides of said rib.

10. An expansion anchor assembly in combination with a dual compartment resin and cartridge inserted into a mine roof opening, the anchor assembly including
(a) an elongated bolt having a head at one end and threaded for a portion of its length at the other end;
(b) an expansion member including an expansion shell having a plurality of leaf segments connected by a ring at one end thereof;
(c) said leaf segments being laterally spaced to form separator slots comprising resin passageways;
(d) a wedge threaded on said elongated bolt for engagement with said expansion shell to urge the latter into gripping engagement with the mine roof;
(e) a plurality of spaced groove-like indentations formed on the outer surface of said wedge and coextensive with the length thereof, thereby forming resin passageways;
(f) the resin passageways of the wedge being aligned with the resin passageways of said expansion shell;
(g) a rib positioned centrally of one of said groove-like indentations and substantially coextensive therewith, thereby forming resin passageway portions within said indentations on opposite sides of said rib;
(h) a portion of said rib extending outwardly beyond the outer periphery of said wedge into a separator slot between adjacent leaf segments, whereby relative rotational movement of said wedge and expansion shell is prevented; and
(i) means for engaging said expansion shell with said bolt.

11. The expansion anchor assembly of claim 10, wherein
(a) said means comprises a snap ring pressed into the threaded portion of said elongated bolt at a location adjacent the base of said expansion shell to prevent accidental movement of the latter relative to said elongated bolt.

* * * * *